United States Patent [19]

Schwemmer

[11] 3,948,501

[45] Apr. 6, 1976

[54] RESILIENT MOUNTING

[75] Inventor: Leonard J. Schwemmer, Erie, Pa.

[73] Assignee: Lord Corporation, Erie, Pa.

[22] Filed: Oct. 31, 1974

[21] Appl. No.: 519,886

[52] U.S. Cl. .................... 267/140; 61/48; 114/119; 293/1
[51] Int. Cl.² ........................................... F16F 7/12
[58] Field of Search ........... 267/140, 141, 153, 156, 267/63 R, 63 A; 61/48; 114/219; 293/1, 60, 70

[56] References Cited
UNITED STATES PATENTS

| 3,593,981 | 7/1971 | Tank | 267/153 |
| 3,677,017 | 7/1972 | Shirrany | 61/48 |
| 3,779,536 | 12/1973 | Lachmann | 267/140 |

Primary Examiner—James B. Marbert
Attorney, Agent, or Firm—James W. Wright; Maurice R. Salada

[57] ABSTRACT

An elongate body of elastomeric material of substantially uniform width and thickness has support plates fixedly attached to opposite ends of the body of elastomeric material. The plates are oriented substantially parallel to each other and normal to the longitudinal axis of the body of elastomeric material. A rigid wedge member is mounted within and transversely of the body of elastomeric material between and in spaced relation to the plates. The wedge member forms a wedge angle in the body of elastomeric material for controlling the direction of buckling.

7 Claims, 7 Drawing Figures

U.S. Patent  April 6, 1976  3,948,501
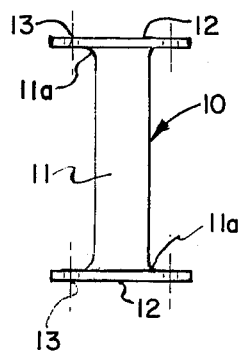
PRIOR ART
FIG. 1
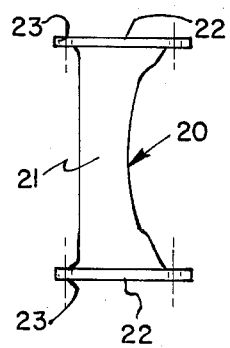
PRIOR ART
FIG. 2
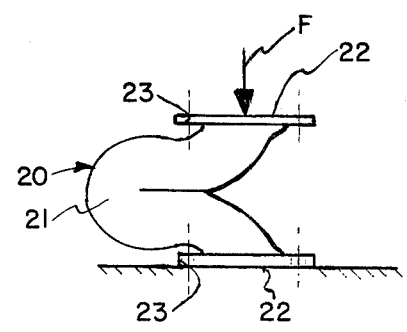
PRIOR ART
FIG. 3
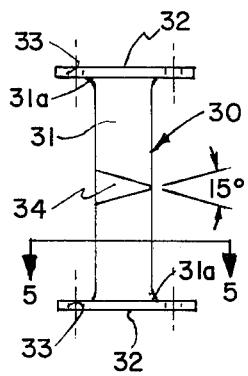
FIG. 4
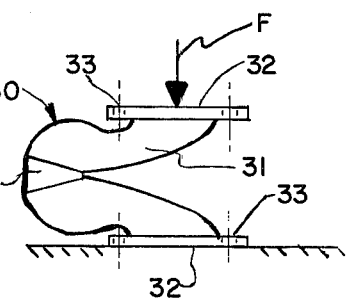
FIG. 5
FIG. 6
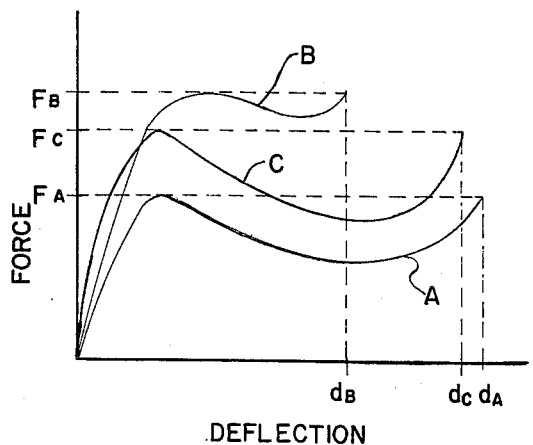
FIG. 7

RESILIENT MOUNTING

BACKGROUND OF THE INVENTION

This invention relates to resilient mountings and, in particular, to resilient mountings suitable for use in marine fender assemblies for piers, docks, and the like.

In conventional marine fender assemblies, a fender supported by piles or other means is spaced from and extends along the pier for engagement by a marine vessel. Resilient mountings are disposed between the fender and pier for absorbing the impact energy of the mooring marine vessel. It is desirable to absorb this impact energy at acceptable, relatively low force levels so as not to damage the vessel and/or pier.

Much attention has heretofore been directed at the structure of the resilient mountings. One particular type resilient mounting that has been highly successful is described in U.S. Pat. Re. No. 27,318, assigned to the assignee of the present invention. The resilient mounting there disclosed comprises an elongate body of elastomeric material, such as natural or synthetic rubber which, under axial thrusts of relatively small force, acts as a column under compression and which, under thrusts of greater force, buckles laterally, allowing further deflection without a substantial increase in reaction force until snubbing begins. Buckling takes place in such bodies of elastomeric material when one of the ratio of length to the minimum width or ratio of length to minimum thickness is about two or more. The greater the ratio, the lower the force at which buckling initiates.

Resilient mountings of the foregoing type are particularly suited for marine fender assemblies because of their ability to absorb and dissipate, damp, the large impact energy of a berthing marine vessel at relatively low impact or reaction force levels compared to most other type resilient mountings presently known.

For various reasons, some of which are discussed in the above-referenced patent, it is desirable to control the direction of buckling of such elongate bodies of elastomeric material. In U.S. Pat. Re. No. 27,318, the resilient mounting is contoured to determine the direction of buckling. Such contouring increases the force level at which buckling initiates, constitutes an inefficient use of a portion of the elastomeric material, requires complex and expensive molds for manufacture, and limits the amount of deflection that may take place prior to snubbing.

Another technique for controlling or determining the direction of buckling in elongate bodies of elastomeric material is disclosed in U.S. Pat. Nos. 3,677,017 and 8,803,853. In these patents, support plates, bonded to each end of the elongate body of elastomeric material, include a deflection guide member carried thereby. The deflection guide members cooperate to control the direction of buckling. However, this technique requires modification to or adjacent both of the support plates, and restricts the permissible amount of relative movement of the support plates toward each other. The deflection guide members also create areas of high stress concentration within areas highly stressed in compression adjacent the support plates.

SUMMARY OF THE INVENTION

With the foregoing in mind, it is an object of the present invention to provide a resilient mounting formed from an elongate body of elastomeric material which efficiently utilizes the elastomeric material while controlling the direction of buckling.

Another object of the present invention is to control the direction of buckling of an elongate body of elastomeric material wherein the means for controlling the direction of buckling does not restrict the motion that may be accommodated.

The foregoing objects and others are provided in a resilient mounting comprising an elongate body of elastomeric material of substantially uniform width and thickness. Support plates are fixedly attached, preferably bonded, to opposite ends of the body of elastomeric material. The plates are oriented parallel to each other and normal to the longitudinal axis of the body of elastomeric material. A rigid wedge member is mounted within and transversely of the body of elastomeric material between and in spaced relation to the plates.

The body of elastomeric material preferably includes a ratio of length to width or thickness of at least about two, with the wedge member forming a wedge angle midway between and symmetrically relative to the support plates along the minimum dimension of the width and thickness of the body of elastomeric material.

The included angle formed by the wedge member may be preselected in conjunction with the dimensional characteristics of the body of elastomeric material to determine the force level at which buckling is initiated. An included angle of 15° has been found suitable.

BRIEF DESCRIPTION OF DRAWINGS

FIGS. 1 and 2 are elevational views of prior art resilient mountings;

FIG. 3 is an elevational view of the prior art mounting of FIG. 2 subjected to buckling;

FIG. 4 is an elevational view of the resilient mounting of the present invention;

FIG. 5 is a sectional view taken substantially along the line 5—5 of FIG. 4;

FIG. 6 is an elevational view of the resilient mounting of FIG. 4 subjected to buckling; and FIG. 7 is a comparative, graphical illustration of the performance of the mounting of the present invention with the prior art mountings of FIGS. 1 and 2.

DESCRIPTION OF PREFERRED EMBODIMENT

With reference to FIG. 1, there is shown a prior art resilient mounting, generally indicated at 10. The prior art resilient mounting 10 comprises an elongate body 11 of elastomeric material of substantially uniform width and thickness. Support plates 12 are fixedly attached by chemical bonding to opposite ends of the body 11 of elastomeric material. The plates 12 are oriented parallel to each other and normal to the longitudinal axis of the body 11 of elastomeric material. Radial fillets 11a are provided about the perimeter of body 11 at its juncture with the support plates 12 for enhancing the area of bonding between the body 11 and support plates 12 and to reduce stress concentrations at the juncture of body 11 and support plates 12. The support plates 12 are adapted for mounting between support structure. For this purpose, apertures 13 are provided in the support plates 12 adjacent its outer perimeter for receiving therethrough bolt means for attaching to the support structure. In a marine fender assembly, the resilient mounting 10 would be mounted between the fender and pier for absorbing the impact energy of a mooring marine vessel.

The elastomeric body 11 has a ratio of length to thickness or width of at least about two in order to insure the existence of the buckling characteristic. With reference to Curve A of FIG. 7, there is shown the force-deflection characteristics of the resilient mounting of FIG. 1. Upon initial loading axially of the body 11, it acts as a column under compression. Once the force reaches a threshold, buckling is initiated and further deflection occurs without a substantial increase in force until snubbing begins between portions of the body 11 of elastomeric material adjacent support plates 12. Once snubbing begins, the resilient mounting acts as a compression mounting with the force increasing exponentially with deflection.

As will be apparent, the performance characteristics of the resilient mounting 10 are quite suitable for use in marine fender assemblies. The resilient mounting 10 is capable of absorbing large impact energies at relatively low impact or reaction force levels. The region of the force deflection curve in which buckling takes place provides this desirable feature. However, as will be apparent, the direction of buckling of the body 11 of elastomeric material is unpredictable. In many applications where such mountings may be utilized, it is desirable for various reasons to control the direction of buckling.

With reference to FIG. 2, there is shown another prior art resilient mounting 20, similar to that of FIG. 1, which has been modified to predetermine the direction of buckling. Details regarding this resilient mounting are described in Gensheimer, U.S. Pat. Re. No. 27,318. The resilient mounting 20 comprises an elongate body 21 of elastomeric material and support plates 22 bonded to each end thereof. While the width of the elastomeric body 21 is substantially uniform, the thickness has been varied or contoured to control the direction of buckling. The body 21 of elastomeric material has a ratio of length to the minimum thickness of at least about two to insure buckling. For purposes of the present illustration, the minimum thickness of the body 21 is the same as the minimum thickness of body 11 of resilient mounting 10. In both instances the widths of the bodies 11 and 21 are greater than their respective minimum thicknesses. The thickness of the body 21 is minimum at its midpoint and progressively increases along one side thereof toward support plates 22. This non-symmetrical contouring of the body 21 of elastomeric material predetermines that buckling will take place to the left of FIG. 2. In FIG. 3 there is shown the application of an axial thrust, F, to the resilient mounting 20 which subjects it to buckling. Curve B of FIG. 7 illustrates the performance characteristics of the resilient mounting 20. As will be recognized in comparison to mounting 10, Curve A, the mounting 20 is initially stiffer, buckling is initiated at a higher force level, and snubbing initiates at a lower deflection.

In FIG. 4 there is shown a resilient mounting 30 of the present invention. The resilient mounting 30 comprises an elongate body 31 of elastomeric material of substantially uniform width and thickness. Similar to the resilient mounting 10, support plates 32 are fixedly attached by chemical bonding to opposite ends of the body 31 of elastomeric material. The plates 32 are oriented parallel to each other and normal to the longitudinal axis of the body 32. Radial fillets 31a are provided about the perimeter of body 31 at its juncture with support plates 32 as described for mounting 10.

The support plates 12 include apertures 33 adjacent its outer perimeter for receiving therethrough bolt means for mounting the resilient mounting 30 between support structure, such as in a marine fender assembly between the fender and pier.

The elastomeric body 31 has a ratio of length to minimum of its thickness and width of at least about two in order to insure the existence of its buckling characteristics. A rigid wedge member 34 is bonded within and transversely of the body 31 midway between the support plates 32. The wedge member 34 forms an included wedge angle of about 15° and is oriented along the minimum of the width and thickness of the body 31 symmetrically relative to support plates 32. As shown in FIG. 5, the body 31 is rectangular in transverse cross section with the wedge angle in the plane of the thickness of the body 31, the thickness being less than the width. It will be apparent that the wedge member 34 may take on forms other than that illustrated in FIG. 4 which effectively establish a rigid wedge shaped zone within the elastomeric body 31.

In FIG. 6 the resilient mounting 30 is shown to be subject to an axial force, F, which buckles the body 31 of elastomeric material. It will be noted that the wedge member 34 is displaced outwardly from between the support plates 32 and, thus, does not restrict movement of the plates 32 toward each other. The direction of buckling is in the direction of the thickened portion of the wedge member 34. The force-deflection characteristics of the resilient mounting 30 are shown on a comparative basis by Curve C of FIG. 7 with that of the resilient mountings 10 and 20, Curves A and B, respectively. As shown, the initial portion of the curve is slightly stiffer due to the insertion of the wedge member 34. Buckling is initiated at a force level intermediate that of the mountings 10 and 20. Greater deflection is allowed in mounting 30 than in mounting 20 prior to snubbing.

In rating resilient mountings of the present type, it has been found appropriate to rate the mountings based on force-deflection parameters up to and including the deflection, $d$, at which the deflection force, $F$, equal to the peak deflection force for buckling reoccurs. These parameters are indicated in FIG. 7 as $F_A$, $F_B$, $F_C$ and $d_A$, $d_B$, $d_C$ for Curves A, B and C, respectively. Particular comparisons that have been utilized include: the energy absorbed; the ratio of force to energy absorption; and the energy absorption per unit volume of elastomeric material. Needless to say, it is desirable to have a high energy absorption per se and a high energy absorption per unit volume of elastomeric material while maintaining a low ratio of force to energy absorption. Comparative test results show that the resilient mounting 30 of the present invention exhibits improvements in all three of these bases for comparison over the resilient mountings 10 and 20 while controlling the direction of buckling.

The body 31 of elastomeric material may be formed from natural or synthetic rubber, or the like, materials. The support plates 32 and wedge member 34 may be formed of any relatively rigid material, such as metal, plastic, composites, or the like. Conventional bonding techniques for the materials may be utilized. Since the wedge member 34 illustrated in FIG. 4 divides the elastomeric body 31 into spaced segments, these segments may be separately manufactured and subsequently assembled in forming the mounting 30. This will be of particular importance in facilitating manufacture and handling of large mountings 30.

In the drawings and specification, there has been set forth a preferred embodiment of the invention and, although specific terms are employed, they are used in a generic and descriptive sense only and not for purposes of limitation.

What is claimed is:

1. A resilient mounting comprising
an elongate body of elastomeric material having a substantially uniform width and thickness, opposite ends of the body being oriented parallel to each other and normal to the longitudinal axis of the body,
support plates fixedly attached to the opposite ends of said body of elastomeric material and being disposed parallel to each other and normal to the longitudinal axis of said body of elastomeric material, and
a wedge member having a greater rigidity than said body of elastomeric material, the wedge member being disposed within and transversely of said body of elastomeric material between and in spaced relation to said plates, said wedge member determining the direction of buckling of said elongate body of elastomeric material in response to an axial thrust and being free during said buckling to move from between said plates so as not to restrict movement of said plates axially toward each other.

2. A resilient mounting, as set forth in claim 1, wherein said wedge member is bonded to said body of elastomeric material and said plates are bonded to said body of elastomeric material.

3. A resilient mounting, as set forth in claim 1, wherein said body of elastomeric material is rectangular in transverse cross section.

4. A resilient mounting, as set forth in claim 1, wherein said body of elastomeric material has a ratio of length to the minimum of said width and thickness of at least about two.

5. A resilient mounting, as set forth in claim 1, wherein said wedge member extends throughout the width and thickness of said body of elastomeric material and forms an included wedge angle of about 15°.

6. A resilient mounting, as set forth in claim 1, wherein said wedge member forms a wedge angle in said body of elastomeric material along the minimum of said width and thickness.

7. A resilient mounting, as set forth in claim 1, wherein said wedge member is disposed midway between and symmetrically relative to said support plates.

* * * * *